(12) United States Patent
Lorin De La Grandmaison et al.

(10) Patent No.: US 7,578,654 B2
(45) Date of Patent: *Aug. 25, 2009

(54) ROTORCRAFT BLADE PROVIDED WITH A TILTABLE FLAP

(75) Inventors: François Lorin De La Grandmaison, Hennebont (FR); Michel Morant, Bouc Bel Air (FR); Olivier Ardesi, Aix En Provence (FR); Jacques Gaffiero, Paris (FR)

(73) Assignee: Eurocopter, Marignane (FR)

( * ) Notice: Subject to any disclaimer, the term of this patent is extended or adjusted under 35 U.S.C. 154(b) by 441 days.

This patent is subject to a terminal disclaimer.

(21) Appl. No.: 11/585,208

(22) Filed: Oct. 24, 2006

(65) Prior Publication Data

US 2007/0128026 A1 Jun. 7, 2007

(30) Foreign Application Priority Data

Oct. 26, 2005 (FR) .................................. 05 10915

(51) Int. Cl.
*B64C 9/00* (2006.01)
(52) U.S. Cl. ....................................... 416/23
(58) Field of Classification Search .................. 416/23, 416/24; 244/213, 214, 215
See application file for complete search history.

(56) References Cited

U.S. PATENT DOCUMENTS

| 2,776,718 A | | 1/1957 | Zuck |
| 2,779,555 A | * | 1/1957 | Danielson .................... 244/216 |
| 3,140,066 A | * | 7/1964 | Sutton et al. ................. 244/215 |
| 4,470,366 A | * | 9/1984 | Williams ..................... 114/280 |
| 5,320,491 A | * | 6/1994 | Coleman et al. .............. 416/24 |
| 6,454,207 B1 | | 9/2002 | Yamakawa et al. |
| 2002/0021964 A1 | | 2/2002 | Janker et al. |

FOREIGN PATENT DOCUMENTS

FR 2 770 826 5/1999

\* cited by examiner

*Primary Examiner*—Ninh H Nguyen
(74) *Attorney, Agent, or Firm*—Young & Thompson

(57) ABSTRACT

A rotorcraft rotor blade (1) includes at least one tiltable trailing-edge flap (5), the flap (5) being suitable for pivoting about a virtual hinge axis (Y') extending substantially along the span of the blade (1) and of the flap (5). The blade (1) is remarkable in that it is provided with at least one main ball joint (30) provided with an inner cage (32) together with a first pin (31) and an outer cage (33), the front portion (33') of the outer cage (33) of the main ball joint (30) being connected to a linear actuator (10, 10') arranged in the blade (1) and serving to pivot the flap (5), the first pin (31) of the main ball joint (30) being substantially perpendicular to the virtual hinge axis (Y') about which the flap (5) pivots.

12 Claims, 3 Drawing Sheets

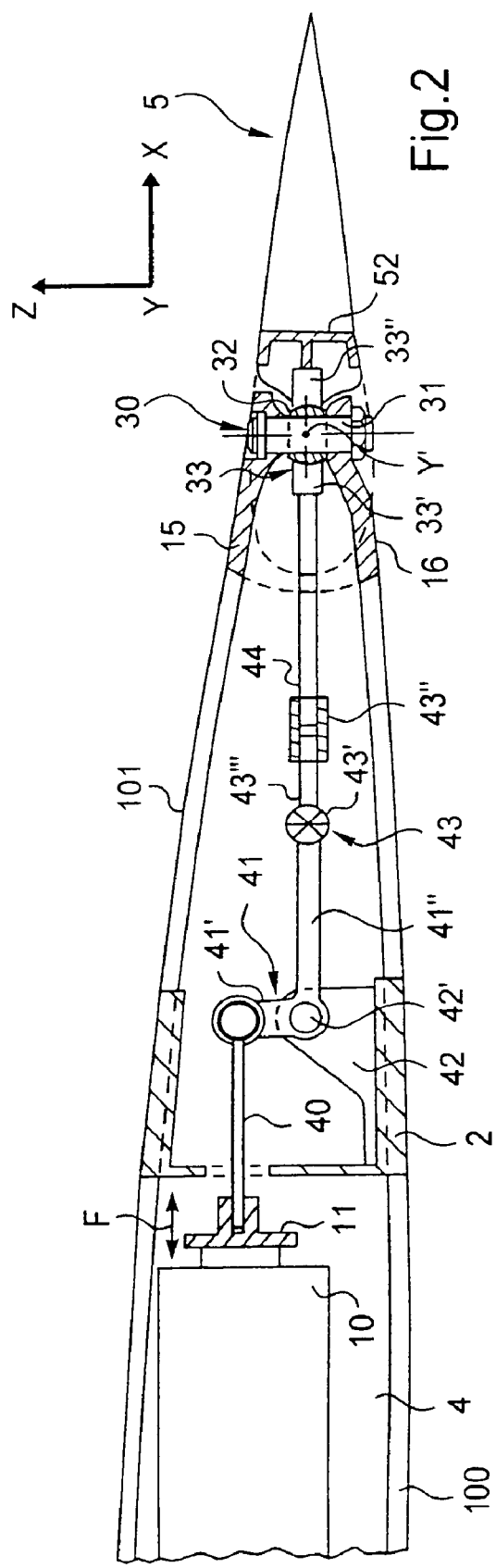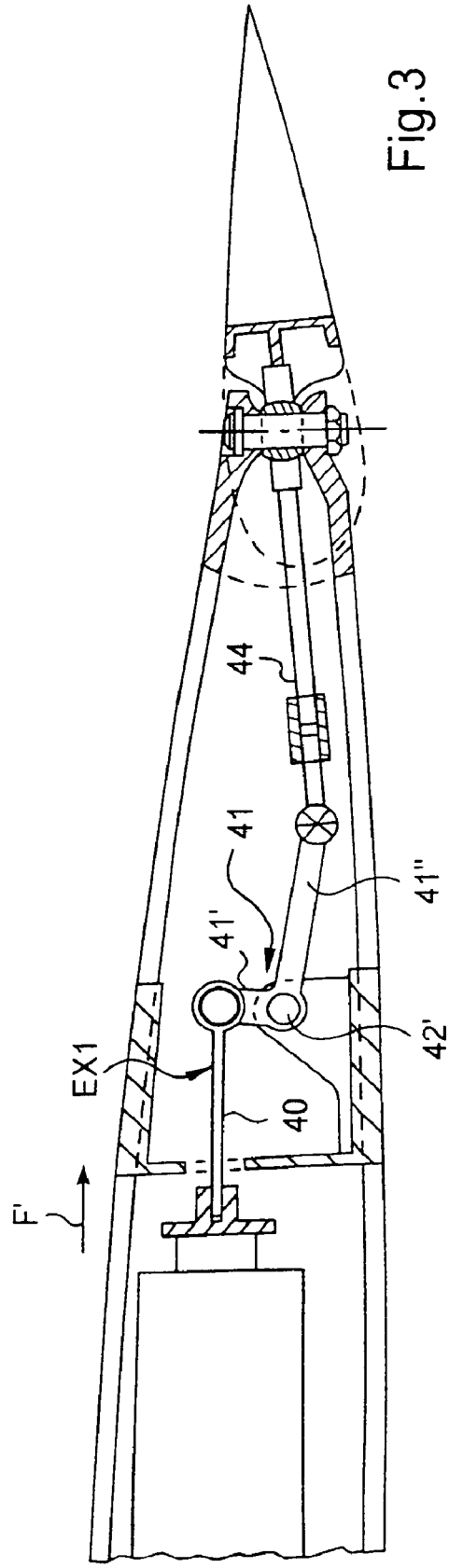

ROTORCRAFT BLADE PROVIDED WITH A TILTABLE FLAP

The present invention relates to an active rotorcraft blade provided at its trailing edge with a flap that is tiltable with the help of at least one main ball joint, the flap being controlled locally by an electromechanical device including a linear actuator.

BACKGROUND OF THE INVENTION

In order to improve the aero-acoustic, vibratory, and aerodynamic performance of the blades of a main lift and advance rotor of a rotorcraft, it is advantageous to place a tiltable flap in the trailing edge of each blade, which flap is conveniently referred to as a trailing edge flap.

The angle through which the flap can be tilted relative to the blade is of the order of ±10° at a frequency of about 30 hertz (Hz). To be effective, the angle of tilt varies actively over time as a function of numerous parameters such as the position of the blade about the axis of the main rotor, referred to as the "azimuth" position, the speed of rotation of the main rotor, and the pitch, beating, and lag movements of the blade.

Given the dimensions of the blade and the stresses that act on the flap and the blade due to the beating, lag, and pitch movements thereof, it will readily be understood that there are difficulties to be overcome in obtaining a flap that is reliable, lightweight, and capable of satisfying the expectations of the manufacturer and of users.

Patent document US 2002/0021964 discloses a first type of blade provided with a flap. The top and bottom portions of the leading edge of the flap are convex in shape, while the central portion of the leading edge is concave in shape. The leading edge of the flap is thus $\epsilon$-shaped.

In addition, the top and bottom portions are each connected to an actuator, while the concave central portion is placed against a bearing element secured to the blade. Consequently, by actuating one or the other of the actuators, the flap can be caused to tilt about the bearing point so as to present the desired inclination.

Nevertheless, under the effect of the stresses exerted on the blade and on the flap in flight, in particular those caused by beating movements, there is a risk of the flap sliding along the bearing point which could lead to premature wear, or even, in a worse-case scenario, to the flap becoming jammed, thereby making it unusable and dangerous.

Furthermore, it can readily be seen that the overall shape of the flap, and more particularly of its leading edge, is not optimized from an aerodynamic point of view and that might possibly lead to noise or vibration disturbance and to degraded aerodynamic performance.

U.S. Pat. No. 6,454,207 discloses a second type of blade having a trailing edge flap.

The flap is secured to the blade about a longitudinal shaft, i.e. extending along the span of the blade, which shaft passes through the blade. Consequently, the flap can pivot about the longitudinal shaft, being driven by a connecting rod secured to the pressure side of the flap via a crank, and itself controlled by an actuator. The connecting rod is thus situated in part outside the blade-and-flap assembly, which is harmful to overall aerodynamics.

In this second type of architecture, the means enabling the flap to pivot about a shaft still present the drawback of it being possible for the flap to jam. It should not be forgotten that the mechanical stresses acting on the flap and the blade in flight are very large. Consequently, there is a non-negligible risk of the shaft being deformed, and under such circumstances the flap could then no longer be tilted to the desired angle of inclination.

Finally, patent document FR 2 770 826 discloses a third type of blade fitted with a flap. The flap is not connected to the blade via a longitudinal shaft, but via two stub axles located on either side of the flap. In addition, the flap is provided with a flexible arm that is positioned inside the blade, being connected via a lever to a set of two rotary motors acting on coaxial eccentrics. Using that set of two rotary motors, the device controls the angle of inclination of the flexible arm, and thus of the flap.

Nevertheless, as for the second type of blade, the stub axles about which the flap tilts do not appear to present sufficient overall robustness to guarantee proper operation of the system over a reasonable length of time.

OBJECTS AND SUMMARY OF THE INVENTION

An object of the present invention is to propose an active blade provided with a flap that makes it possible to overcome the above-mentioned limitations of blades.

Furthermore, it should not be forgotten that the blades of rotorcraft are extremely thin, i.e. the relative thickness of blade sections is small, such that the thickness of the blade is small, very particularly in the vicinity of the trailing edge of the blade where thickness decreases. Thus, the maximum thickness of the flap is about 20 millimeters (mm). Under such circumstances, it goes without saying that the device for causing the flap to tilt relative to the blade must be compact in order to be capable of being housed within the blade and/or the flap.

Furthermore, as mentioned above, it is important for the assembly to be robust in order to avoid premature wear or even jamming of the flap, which might be catastrophic.

Finally, in order to reduce the inertial forces exerted on the blade and the flap, it is essential for the weight of the assembly to remain as small as possible.

According to the invention, a rotorcraft rotor blade comprises at least one tiltable trailing-edge flap, said flap being suitable for pivoting about a virtual hinge axis extending substantially along the span of said blade and of said flap. The blade is remarkable in that it is provided with at least one main ball joint provided with an inner cage together with a first pin and an outer cage, the front portion of said outer cage of the main ball joint being connected to a linear actuator arranged in said blade and serving to pivot said flap, said first pin of the main ball joint being substantially perpendicular to said virtual hinge axis about which said flap pivots.

This configuration is very original since the pin of the main ball joint does not coincide with the virtual hinge axis about which the flap pivots, or at least it is not directed along said axis. This is of great importance insofar as it becomes possible to arrange a ball joint in a space that is nevertheless very constricted.

The use of such a ball joint provides an effective solution to the problem, given the reputation for robustness of that kind of mechanical equipment. Furthermore, there is no need to provide the flap with a longitudinal shaft or with stub axles in order to enable it to pivot, thereby limiting any risk of the flap jamming.

As described with reference to the figures, in order to limit wear in the main ball joint, this main ball joint is prestressed, where necessary.

Furthermore, the main ball joint is advantageously self-lubricating, the faces of its outer and inner cages that are in contact with each other being covered in Teflon, for example.

In addition, pivoting of the flap is optimized when the axis of symmetry of the main ball joint is located substantially at 25% along the chord of the flap starting from the leading edge of the flap.

The first pin of the main ball joint is held in a stationary position. Thus, the first pin is secured to the blade, with the outer and inner cages of the main ball joint being disposed between the top and bottom plates of a fork arranged at the trailing edge of the blade, the first pin of the main ball joint passing through the top and bottom plates.

In addition, the actuator, e.g. of the electromechanical type, is connected to the front portion of the outer cage of the main ball joint successively via a first connecting rod, a crank, an extensible flexible pivot, and then a second connecting rod. When the actuator is caused to move, it moves the first connecting rod linearly, thereby causing the crank to tilt. Consequently, since the first pin of the main ball joint is held stationary by the top and bottom plates and therefore cannot move, the outer cage of the main ball joint pivots about the inner cage, thus enabling the flap to pivot via the rear portion of the outer cage of the main ball joint which is secured to the flap.

Advantageously, the first connecting rod is a flexible leaf, optionally integrated with the crank in a variant of the invention.

In a first embodiment, the extensible flexible pivot comprises a simple pivot, a rod, and a threaded sleeve. The simple pivot is then connected firstly to the crank and secondly to the rod, with the threaded sleeve being secured to the second connecting rod, and with the rod being engaged inside the threaded sleeve.

In a second embodiment, the extensible flexible pivot comprises a spring having turns that touch at rest, the spring being secured firstly to the crank and secondly to the second connecting rod.

Finally, whatever the embodiment selected, depending on the actuator, the size of the flap, and the stresses exerted in flight, it is possible to envisage using a larger number of actuators and of main ball joints, with each ball joint being associated with a respective actuator. Consequently, when the blade has two actuators, the blade is provided with two main ball joints, and the distance between the two main ball joints along the span of the flap is preferably equal to half the total span of the flap.

BRIEF DESCRIPTION OF THE DRAWINGS

The invention and its advantages appear in greater detail in the following description made with reference to the accompanying drawings that show preferred embodiments, given without any limiting character. In the drawings:

FIG. 2 is a section view of a blade constituting a first embodiment;

FIG. 3 shows the movement implemented by the first embodiment;

MORE DETAILED DESCRIPTION

Elements that are present in more than one figure are given the same reference in all of them.

Figure 1:
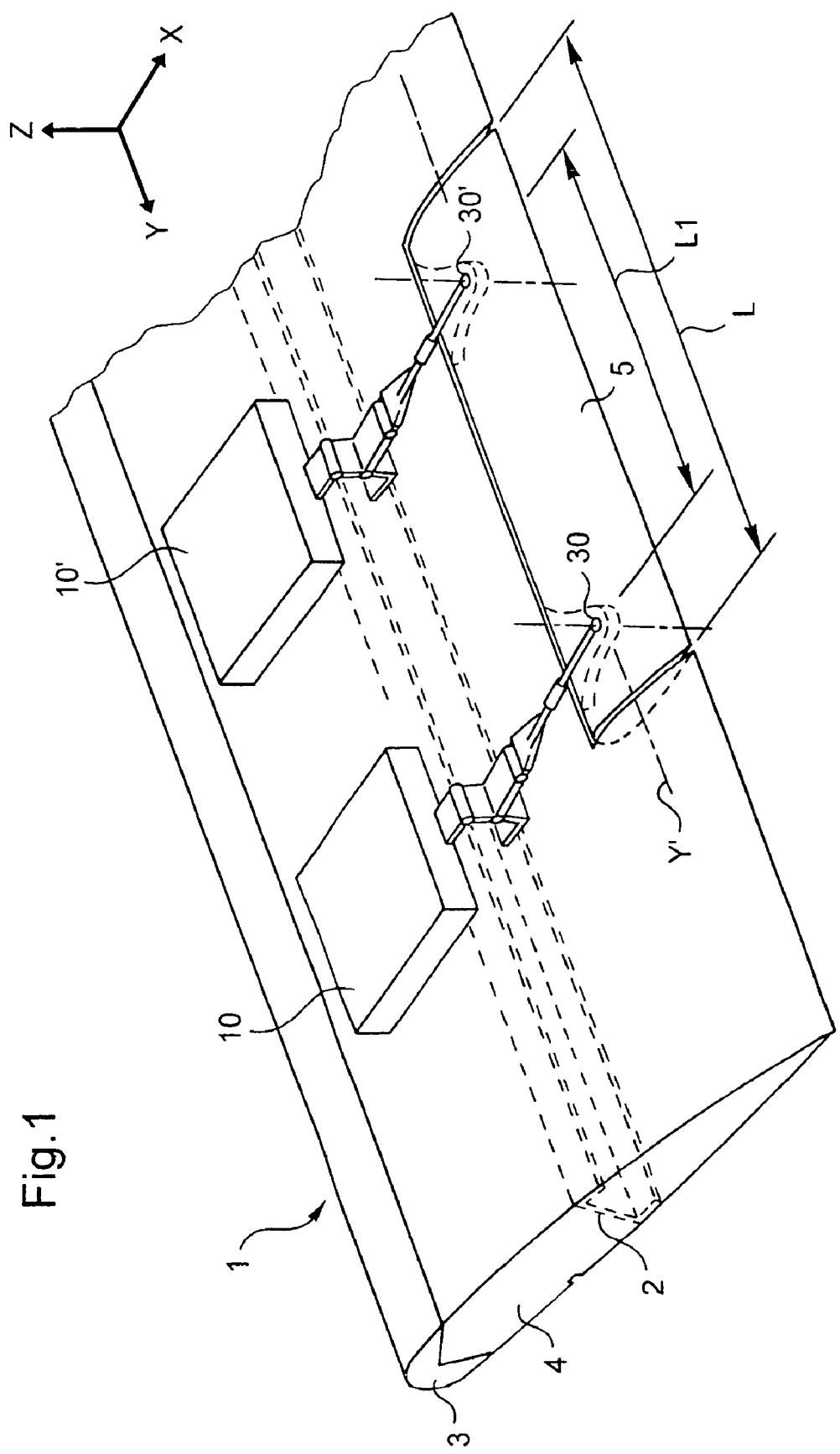
FIG. 1 is a diagrammatic isometric view of a blade constituting a first embodiment.

FIG. 1 is a diagrammatic isometric view showing a first embodiment of the invention.

A rotorcraft blade 1 is provided with a trailing edge flap 5. In addition, two electromagnetic actuators 10 and 10' are disposed inside the box 4 of the blade 1 disposed between the front spar 3 and the channel-section rib 2 of the blade 1.

The actuators 10 and 10' enable the trailing edge flap 5 to pivot about a virtual hinge axis Y' in order to improve the aero-acoustic, aerodynamic, and vibratory performance of the blade 1. The actuators are themselves controlled by an electronic unit (not shown in the figures) that delivers the flap-control relationship (tilt angle/frequency) as a function of the flight configuration of the rotorcraft. The actuators 10 and 10' are powered electrically via slip rings disposed in the rotorcraft rotor and via an electrical circuit integrated in the blade 1 along its span.

In active mode, position sensors deliver signals to the electronic unit to enable it to servo-control the flap. In certain flight configurations, the system is in a passive mode, with the flap 5 then remaining stationary in position in line with the basic profile of the blade 1.

Depending on requirements, one or more flaps are arranged on the blade 1, preferably in the vicinity of the free end thereof.

Naturally depending on requirements, some other number of actuators could be provided. Nevertheless, when the flap 5 is pivoted using two actuators 10 and 10', the main ball joints 30 and 30' associated with the actuators 10 and 10' are preferably spaced apart along the span of the flap 5 by a distance L1 that is equal to half the span L of the flap 5.

FIG. 2 is a section view of a first embodiment of the blade 1.

The trailing edge of the blade 1 includes a fork provided with a top plate 15 and a bottom plate 16, the fork being suitable for securing to a rib of the blade that is not shown. A main ball joint 30 is arranged in the fork.

More precisely, the main ball joint 30 comprises a first pin 31, an inner cage 32, and an outer cage 33. The inner and outer cages 32 and 33 are disposed between the top and bottom plates 15 and 16, with the first pin 31 passing through the top and bottom plates 15 and 16 and being secured thereto. Consequently, it is clear that the first shaft is secured to the blade 1 and can under no circumstances be set into movement. In addition, the first pin 31 of the main ball joint 30 is substantially perpendicular to the virtual hinge axis Y' of the flap 5.

In addition, the rear portion 33" of the outer cage 33 of the main ball joint 30 is secured to the flap 5, by being embedded in the flap 5 or by being secured to the rib 52 of the flap 5, for example. Any movement of the outer cage 33 thus implies movement of the flap 5.

To impart this movement, and more particularly to impart pivoting of the flap 5 about the virtual hinge axis Y', the blade 1 has an actuator 10 arranged in the box 4 of the blade 1. The actuator is a linear actuator with an end 11 suitable for moving along the X axis as shown by double-headed arrow F. There can be seen an access hatch 100 in the pressure side face of the blade 1 for use when performing maintenance operations on the actuator 10, for example.

The transmission linkage connecting the actuator 10 to the flap 5 comprises in succession: a first connecting rod 40; a bended crank 41; an extensible flexible pivot 43; and a second connecting rod 44.

The first crank 40, which also passes through the rib 2, is secured firstly to the end 11 of the actuator, and secondly to the crank 41, and more particularly to the primary arm 41' of the crank 41.

Furthermore, the bend of the crank 41 is secured to a support 42 via a through pin 42', the support 42 being secured to the rib 2. The crank 41 can thus pivot about the through pin 42'.

Furthermore, the secondary arm 41" of the crank 41 is connected to a second connecting rod 44 secured to the front portion 33' of the outer cage 33 of the main ball joint 30 via a flexible pivot 43. Pivoting of the crank 41 consequently causes the second connecting rod 44 to tilt and thus, given the above description, causes the flap 5 to tilt.

Furthermore, it will readily be understood that the distance between the through pin 42' and the main ball joint 33 remains constant. The same naturally applies to the length of the crank 41 and to the length of the second connecting rod 44. To make tilting possible, it is therefore essential for the flexible pivot to allow lengthening to take place substantially along the axis X. That is why it is referred to for convenience as an extensible flexible pivot.

In the first embodiment, the extensible flexible pivot 43 comprises an ordinary simple pivot 43', a threaded sleeve 43", and a rod 43'''. The simple pivot is connected firstly to the secondary arm 41" of the crank 41 and secondly to the rod 43'''. The rod 43''' is engaged in the threaded sleeve 43", which is itself screwed onto the second connecting rod 44. The engagement of the rod 43''' in the threaded sleeve allows the rod 43''' to move relative to the threaded sleeve 43" along the axis X.

Finally, an access hatch 101 is provided in the suction side of the blade 1 to enable an operator to access the transmission linkage.

Furthermore, in order to limit wear of the main ball joint 30, it is prestressed in order to take up any slack between the inner and outer cages 32 and 33 of the main ball joint 30.

The centrifugal forces that act on the assembly comprising the flap and the main ball joint naturally exert prestress on the main ball joint in the span direction of the blade. If the level of this prestress is high enough, then the inner and outer cages 32 and 33 of the main ball joint 30 always remain in contact in spite of the other forces (dynamic, aerodynamic, and control) to which they are subjected along the chord direction of the blade.

Nevertheless, if the level of stress that is provided naturally by centrifugal forces is not sufficient, then the main ball joint 30 is prestressed mechanically. Consequently, the blade includes a spring type device inserted between the flap 5 and the trailing edge of the blade, serving to exert a force continuously, e.g. tending to move the flap 5 away from the trailing edge of the blade.

FIG. 3 shows the movement implemented in the first embodiment in order to pivot the flap 5.

The electronic unit controls the actuator 10 so as to move its end in the direction of arrow F'. The first connecting rod 40 then pushes the primary arm 41' to the right in the figure, thereby causing the crank 41 to tilt about the through pin 42'. The secondary arm 41" thus tilts downwards causing the second connecting rod 44 to slope upwards. In order to perform this movement, the rod 43''' moves a little inside the threaded sleeve.

As mentioned above, the second connecting rod 44 is secured to the front portion 33' of the outer cage 33 of the main ball joint 30. Since the first pin 31 is stationary, the outer cage 33 pivots about the inner cage 32, thereby enabling the flap 5 to pivot about the virtual hinge axis Y'.

Naturally, these movements are reversed to cause the flap to pivot downwards.

Furthermore, the first connecting rod 40 is advantageously flexible. Although the movements are of relatively small amplitude, the tilting of the crank 41 flexes the end EX1 of the first connecting rod 40, where such flexing could in the long run damage the connecting rod or the actuator. That is why it is preferable for the first connecting rod to be a flexible leaf.

Figure 4:
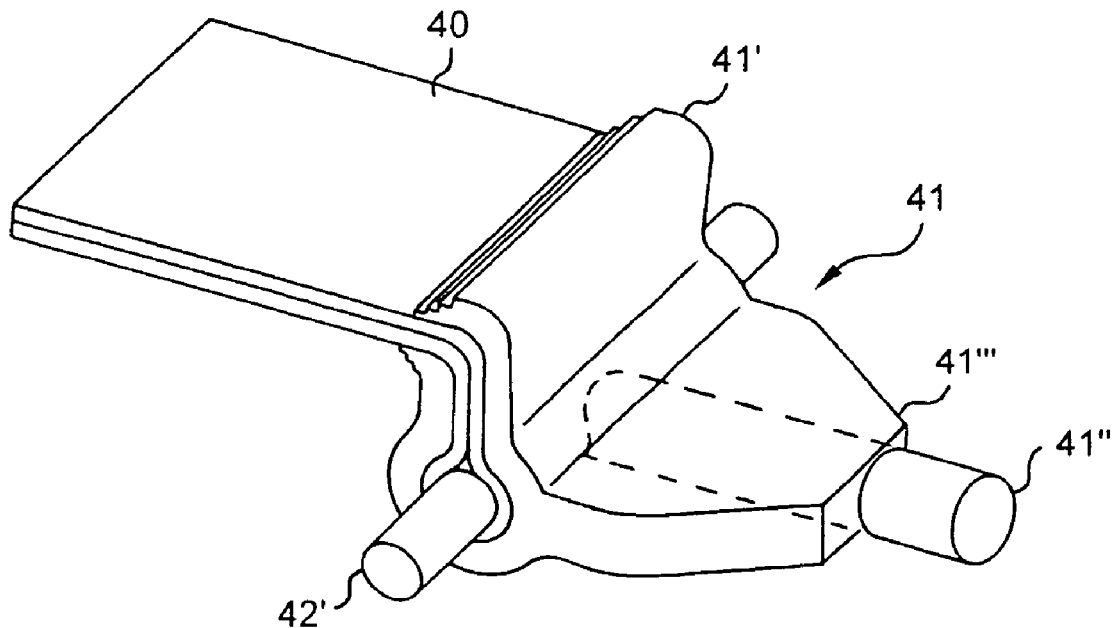
FIG. 4 shows a variant of the first embodiment.

In a variant embodiment, shown in FIG. 4, the first connecting rod 40 in the form of a flexible leaf is integrated in the crank 41 so as to constitute a single component of composite material which is advantageous from the points of view of the cost and of the weight of the device. Glass fabric surrounds the through pin 42' so as to form the first connecting rod 40 which also constitutes part of the primary arm 41'.

The secondary arm 41", which is subsequently secured to the extensible flexible pivot, is then disposed perpendicularly to the through pin 42'. Other glass fabric 42''', for example, then covers the through pin 42', the secondary arm 41", and the glass fabric of the first connecting rod 40 forming part of the primary arm 41'.

Figure 5:
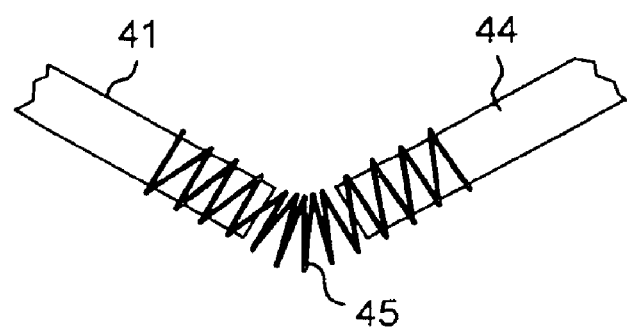
FIG. 5 shows the flexible pivot in a second embodiment.

With reference to FIG. 5, in a second embodiment, the extensible flexible pivot comprises a spring 45 with turns that are touching at rest. This spring makes it possible both for movements to take place along the axis X and for the crank 41 and the second connecting rod 44 to pivot. The spring presents sufficient stiffness to avoid it becoming deformed as a result of the stresses exerted on the blade 1.

Furthermore, the extensible pivot is advantageously coated in an elastomer material (not shown in FIG. 5) serving to improve the strength of the extensible pivot while also preserving its flexibility.

The movement of this second embodiment is then substantially equivalent to that described with reference to FIG. 3.

Naturally, the present invention can be subjected to numerous variants as to its implementation. Although several embodiments are described above, it will naturally be understood that it is not conceivable to identify exhaustively all possible embodiments. It is naturally possible to envisage replacing any of the means described by equivalent means without going beyond the ambit of the present invention.

Thus, in a variant of the invention that is not shown in a figure, the blade includes at least one main ball joint that is controllable by an actuator, and at least one fastener ball joint that is not controllable by an actuator and that is provided with an outer cage, an inner cage, and a second pin. In such a configuration, the arrangement of the fastener ball joint is identical to that of the main ball joint. Consequently, the outer and inner cages of the fastener ball joint are disposed between the top and bottom plates 15 and 16, with the second pin passing through the top and bottom plates 15 and 16 and being secured thereto. Nevertheless, the front portion of the outer cage of the fastener ball joint is not connected to an actuator, which means that the fastener ball joint cannot be controlled.

By analogy with the variant shown in FIG. 1, it should be understood that the controllable main ball joint and the non-controllable fastener ball joint are preferably spaced apart along the span of the flap by a distance that is equal to half the total span of the flap.

What is claimed is:

1. A rotorcraft rotor blade (1) including at least one tiltable trailing-edge flap (5), said flap (5) being suitable for pivoting about a virtual hinge axis (Y') extending substantially along the span of said blade (1) and of said flap (5), said blade (1) including at least one main ball joint (30) provided with an inner cage (32) together with a first pin (31) and an outer cage (33), the front portion (33') of said outer cage (33) of the main ball joint (30) being connected to a linear actuator (10, 10') arranged in said blade (1) and serving to pivot said flap (5), said first pin (31) of the main ball joint (30) being substantially perpendicular to said virtual hinge axis (Y') about which said flap (5) pivots.

2. A blade according to claim 1, wherein the axis of symmetry of said main ball joint (30) is arranged substantially 25% of the way along the chord of said flap (5), starting from the leading edge of said flap (5).

3. A blade according to claim 1, wherein said main ball joint (30) is self-lubricating.

4. A blade according to claim 1, wherein said first pin (31) is secured to said blade (1), said outer and inner cages (33, 32) of the main ball joint (30) being disposed between the top and bottom plates (15, 16) of a fork arranged at the trailing edge of the blade, said first pin (31) of the main ball joint (30) passing through said top and bottom plates (15, 16).

5. A blade according to claim 4, wherein said actuator (10) is connected to said front portion (33') of the outer cage (33) of said main ball joint (30) successively via a first connecting rod (40), a crank (41), an extensible flexible pivot (43), and then via a second connecting rod (44).

6. A blade according to claim 5, wherein said first connecting rod (40) is a flexible leaf.

7. A blade according to claim 6, wherein said flexible leaf is integrated with said crank (42).

8. A blade according to claim 5, wherein said extensible flexible pivot (43) comprises a simple pivot (43'), a rod (43'''), and a threaded sleeve (43"), said simple pivot (43') being connected firstly to said crank (42) and secondly to said rod (43'''), the threaded sleeve (43") being secured to the second connecting rod (44), said rod (43''') being engaged in said threaded sleeve (43").

9. A blade according to claim 5, wherein said extensible flexible pivot (43) comprises a spring (45) having turns that touch at rest, said spring (45) being secured firstly to said crank (42) and secondly to said second connecting rod (44).

10. A blade according to claim 4, wherein the rear portion (33") of the outer cage (33) of the main ball joint (30) is secured to the flap (5).

11. A blade according to claim 1, wherein said blade (1) has two actuators (10, 10'), said blade being provided with two main ball joints (30, 30') spaced apart by a distance (L1) along the span of the flap that is equal to half said span (L) of said flap.

12. A blade according to claim 1, wherein said blade includes at least one fastener ball joint that is not controllable by an actuator.

* * * * *